Patented Oct. 8, 1929

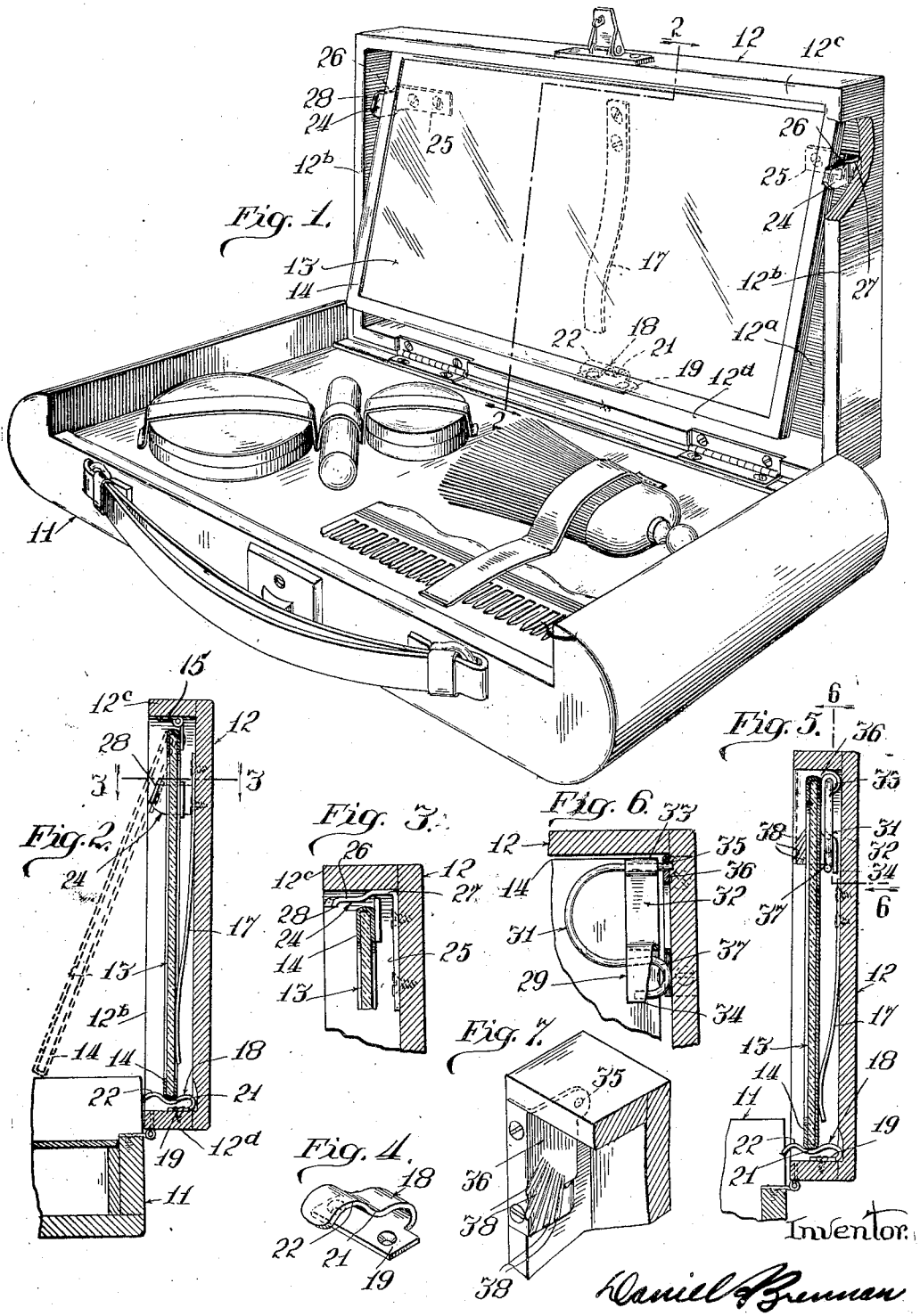

1,730,555

UNITED STATES PATENT OFFICE

DANIEL A. BRENNAN, OF CHICAGO, ILLINOIS

VANITY CASE

Application filed June 16, 1926. Serial No. 116,317.

The present invention relates broadly to a vanity or over-night case having a mirror mounted therein, and has particular reference to improvements pertaining to means for tiltably mounting the mirror in the case and for holding the mirror in its different angular positions therein. These mirrors are usually mounted in cover sections of the vanity case, and the purpose of tiltably supporting the mirror therein is to avoid the necessity of propping the case up at an angle, or of holding it in the hand, in order to dispose the mirror at the proper angle for convenient use.

One of the principal objects of the invention is to provide simple and readily operable means for tiltably supporting the mirror within the vanity case, whereby it may be moved to an appropriate angle for use almost instantly, without the necessity of performing numerous releasing and adjusting operations thereon.

Another object of the invention is to provide a tiltable mirror of the type which will be moved automatically to a tilted position by the simple releasing thereof.

Another object is to provide means which will function normally to hold the mirror at one particular angle when in use, but which will, nevertheless, permit the mirror to be moved to other angles of inclination, if desired.

Other objects pertaining to the details of these parts, and to the general relation of the entire combination, will appear in the following description of a preferred embodiment of the invention.

In the drawings illustrating this embodiment:

Fig. 1 is a perspective view showing the present vanity case with the tilting mirror mounted in its cover section and with the mirror shown in one of its tilted positions.

Fig. 2 is a transverse section through the vanity case, taken on line 2—2 of Fig. 1 showing the mirror in retracted position in full lines and in tilted position in dotted lines.

Fig. 3 is a fragmentary sectional view taken on line 3—3 of Fig. 2 showing the detent means for limiting the outward tilting angle of the mirror.

Fig. 4 is a perspective view of the locking or detent means for holding the mirror in its normal position back in the cover section.

Fig. 5 is a view similar to Fig. 2, illustrating a modified construction.

Fig. 6 is a fragmentary section taken on line 6—6 of Fig. 5, and

Fig. 7 is a fragmentary view of a modified form of detent means for holding the mirror in its different positions.

Vanity cases of this kind are usually so constructed that, when in open position, the sections are held substantially at right angles to each other as shown in Figures 1 and 2.

In the majority of these vanity cases the mirror is fixedly secured in the cover section, consequently when the sections are in open position, it is difficult to use the mirror conveniently, as for example when the case is resting on a table or in the user's lap, for the reason that it is necessary either to prop the case at the proper angle or to hold the case in one hand, in order to dispose the mirror at the proper angle.

These objections I have overcome by the improved construction which I shall now describe.

The vanity case proper consists of a receptacle section 11, and a closure section 12, in the latter of which sections the mirror 13 is pivotally mounted. This latter section is of box-like form, comprising the back wall 12$^a$, the two end walls 12$^b$, and the top and bottom walls 12$^c$ and 12$^d$ respectively.

Referring first to the embodiment illustrated in Figures 1, 2 and 3, the mirror 13 is mounted in a suitable frame 14 along the upper edge of which hinge members 15 are secured. The other leaves of these hinge members are secured to the cover section 12, preferably to the top wall 12$^c$ thereof. The free lower edge of the mirror is adapted to be swung outwardly to tilted position through the impetus of a spring 17 reacting between the mirror and the back wall 12$^a$ of the cover section. This spring is preferably a leaf spring, having its upper end suitably secured to the cover section and its lower end bearing against the back of the mirror adjacent the lower edge thereof. The rear side of the mirror, at the point where the lower end of the leaf spring bears against the same, is heavily shellacked or otherwise protected to prevent scratching of the mirror by the leaf spring.

The mirror is normally held in its retracted position, within the confines of the cover section 12, by a releasable detent 18 during both the open and closed positions of the closure section 12. This detent 18 is illustrated in detail in Fig. 4 and comprises an attaching portion or base 19, which is screwed or otherwise secured to the bottom wall 12$^d$ of the cover section. Extending from this attaching base is a spring member comprising a depressed portion 21 and a downwardly inclined extending end portion 22. When the mirror is pushed back into its retracted position within the cover section, the lower edge of the mirror engages the downwardly inclined portion 22 of this detent, camming the same downwardly and allowing the depressed portion 21 to snap upwardly over the lower edge of the mirror when the mirror is in its fully retracted position. As shown in Fig. 2, when the lower edge of the mirror is engaging in the depressed portion 21, it is resiliently held against movement in either direction. This is of particular advantage as it prevents the mirror from moving backward and striking the back wall 12$^a$ of the cover section, as well as preventing it from moving forward and striking articles within the vanity case, so that all possibility of breakage of the mirror through dropping or jarring of the vanity case is avoided. When it is desired to move the mirror to a tilted position for convenient use thereof, it is only necessary to depress the projecting end 22 of the detent, whereupon the spring 17 automatically swings the mirror outwardly to a tilted position.

I have also provided improved means functioning in the nature of stops or detents for predetermining the angle to which the mirror will be tilted by the spring 17; which stop means, however, is so constructed that the mirror may be made to assume other tilted angles if desired. These stop members comprise small spring clips 24 which are secured adjacent the end walls 12$^b$ of the cover section so as to engage with the lateral edges of the mirror. As best shown in Fig. 3, each of these clips comprises an attaching portion 25, preferably secured to the back wall 12$^a$ of the cover section. Extending from the ends of these attaching portions are short spring portions 26 which are spaced from the end walls 12$^b$ of the cover section. Between the attaching portion 25 and the spring portion 26, each clip is formed with a depressed portion 27 for permitting unrestrained tilting movement of the mirror through a predetermined angle. The outer ends of the spring portions 26 have inwardly turned lips 28 which serve as positive stops for limiting the outward movement of the mirror.

The lateral edges of the mirror frame 14 may be arranged to contact directly with each of these yielding stop members; or short lugs or projections 29 may be secured to the mirror frame, or formed as an integral part thereof, so as to project beyond the mirror frame to engage with these stop members.

In the operation of this embodiment, when the holding detent 18 is released, the mirror is automatically swung outwardly to a tilted position through the free movement of the projections 29 in the depressed portions 27 of the stop clips. The engagement of these projections 29 with the inner ends of the spring portions 26 will limit this first outward movement of the mirror to a relatively small tilted angle. If it is desired to dispose the mirror at a more inclined angle, it is only necessary to grasp the edge of the mirror and pull it outwardly, the engagement of the projections 29 along the spring portions 28 of the clips thereafter holding it at its selected angle.

In the embodiment shown in Figs. 5, 6 and 7, I have employed the same arrangement of spring pressed mirror with the spring holding detent 18, but have illustrated a modified construction of combined pivot and angle retaining stop for the mirror. In this construction wire springs 31, having a double loop or S-shaped outline, are secured to the rear side of the mirror at each upper edge thereof. These springs are fastened to the mirror by clips 32 which are rigidly looped around the upper ends of the springs at 33 and which have rearwardly deflected guide portions 34 which guide the lower portions of the springs. The upper ends of the springs project beyond the edges of the mirror into holes 35 in plates 36 secured to the end walls of the cover section. The projecting ends of these springs thus serve as pintles for hingedly supporting the mirror at its upper edge. The lower looped ends of the springs project laterally from the edges of the mirror as indicated at 37 in Fig. 6, for effecting detent engagement with radially extending slots 38 formed in the adjacent face of the plate 36.

In the operation of this embodiment, the lower loop 37 of the spring slides up along the inclined surface 39 of the plate 36, until the spring snaps into the first radial slot 38. This determines the initial position of the mirror, to which it is urged by the leaf spring 17. If it is desired to dispose the mirror at greater angles of inclination, it is only necessary to pull the lower edge of the mirror outwardly, as heretofore described, whereupon the looped end 37 of the detent spring will snap into one of the adjacent slots 38 and hold the mirror in its desired position. The resiliency of the looped upper end of the spring yieldingly forces the lower projecting portion 37 laterally into engagement with these slots 38.

I do not intend to be limited to the particular details herein shown and described, as it will be obvious that the foregoing is merely an exemplary embodiment of the invention.

I claim:

1. In a vanity case comprising pivotally secured receptacle and closure sections, a mirror tiltably supported in one of said sections, and means frictionally engaging the edges of said mirror to retain the mirror in tilted position.

2. In a vanity case comprising pivoted sections, a mirror tiltably mounted in one of said sections, means normally retaining the mirror in retracted position in said section during open and closed position of said sections, means to release the mirror from its retracted position, and means operative upon such release to urge said mirror to tilted position.

3. In a vanity case comprising pivoted sections, means for pivotally mounting a mirror in one of said sections, means for holding said mirror in retracted position on one of said sections during open position of said sections, and means disposed between the mirror and said mirror carrying section and operative to urge said mirror into angular position upon release of said holding means.

4. In a vanity case comprising pivotally connected sections, a mirror tiltably supported in one of said sections, spring means exerting a pressure on said mirror tending to force it into angular position, and means tending to yieldingly arrest the movement of said mirror.

5. In a vanity case comprising pivotal sections, a mirror pivotally mounted in one of said sections, means normally maintaining the mirror in retracted position on said section during open and closed position of said sections, means to release the mirror from its retracted position, means operative upon such release to exert a pressure on said mirror tending to force it into angular position, and means limiting the angle of rotation of the mirror.

6. In a vanity case comprising hinged sections, means for tiltably supporting a mirror therein, means exerting a tilting pressure on said mirror, locking means resisting said pressure to hold the mirror in normal position, and means yieldingly resisting the outward swinging movement of said mirror, after said mirror has moved through a predetermined angle.

7. In a vanity case comprising pivoted sections, a mirror, a frame for said mirror, hinge members on said frame secured to one of said sections, means exerting a tilting pressure on said mirror, locking means resisting said pressure to hold the mirror in normal position, means yieldingly retarding the outward swinging movement of said mirror, and means for positively limiting the angle of rotation of said mirror.

8. In a vanity case comprising pivoted sections, a mirror tiltably supported in one of said sections, a frame on said mirror, a stop on said frame, means for tilting said mirror, means for locking said mirror in untilted position, and means engaging said stop to retard the tilting of and for limiting the angle of rotation of said mirror.

9. In a vanity case having pivoted sections, a mirror tiltably mounted in one of said sections, and means yieldingly resisting the tilting of said mirror after said mirror has been partially tilted.

10. In a vanity case having pivoted sections, a mirror tiltably supported in one of said sections, means for automatically tilting said mirror, and means yieldingly resisting the tilting of said mirror after said mirror has been partially tilted.

11. In a vanity case having two pivoted sections, a mirror tiltably supported in one of said sections, detent means for holding said mirror in a retracted position during open and closed positions of said sections, and spring means for moving said mirror from its retracted position to a tilted position after the release of said detent means.

12. In a vanity case having pivoted sections, a mirror tiltably supported in one of said sections, spring means operative to move said mirror to a tilted position, and yieldable stop means for normally limiting the tilting movement of said mirror under the action of said spring means, said yieldable stop means permitting movement of said mirror to other tilted positions.

13. In a vanity case having pivoted sections, a mirror tiltably supported in one of said sections, and means comprising a resilient detent having a depression therein in which said mirror is positioned in retracted position for yieldably holding said mirror in spaced relation to its associated section.

In testimony whereof I affix my signature at 10 South La Salle Street, Chicago, Illinois.

DANIEL A. BRENNAN.